Dec. 21, 1926.　　　　　　　　　　　　　　　　1,611,618
I. K. TUERCK
POWER TRANSMISSION GEARING
Filed June 21, 1926　　　3 Sheets-Sheet 1
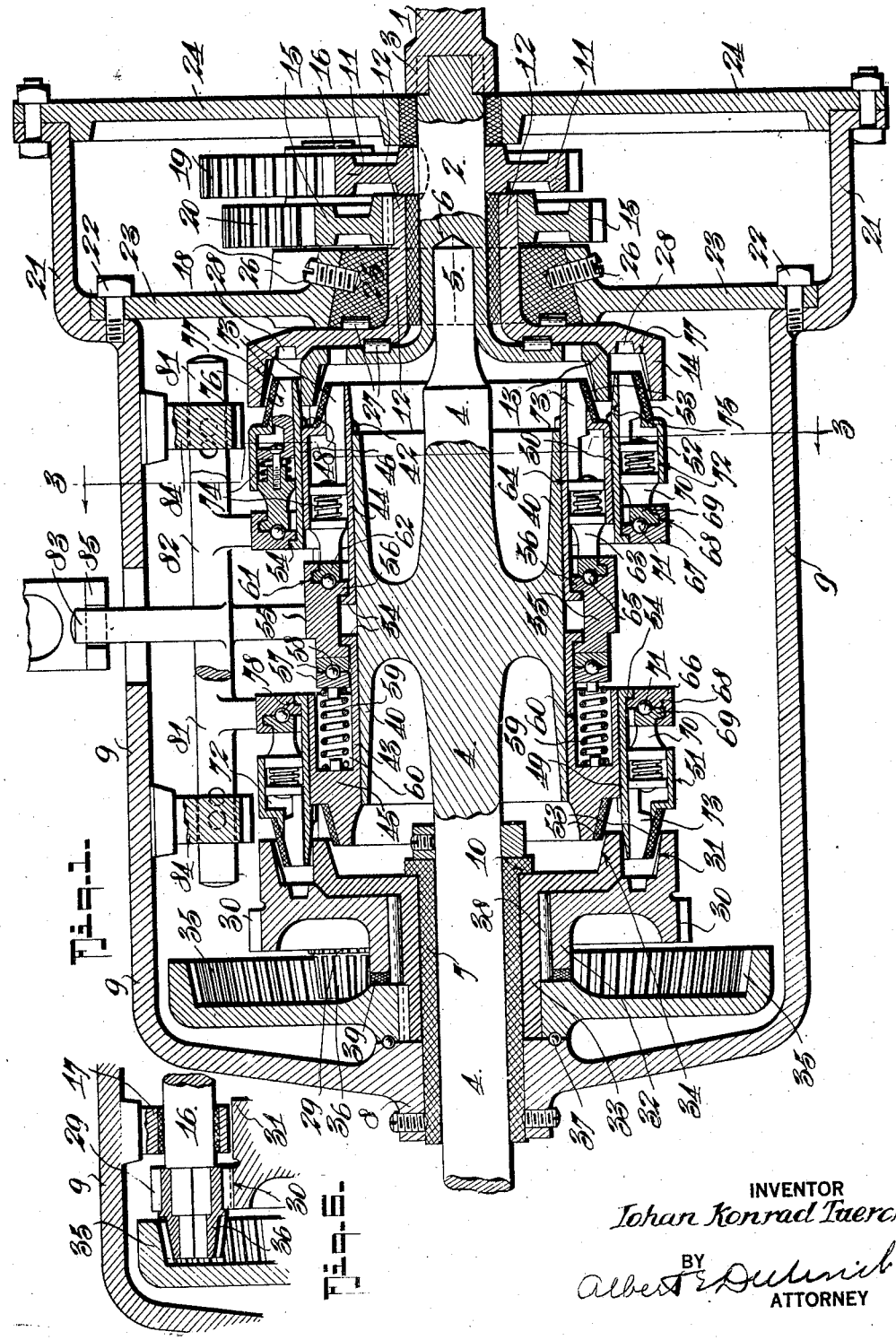
INVENTOR
Johan Konrad Tuerck
BY
Albert E. Dubinil
ATTORNEY

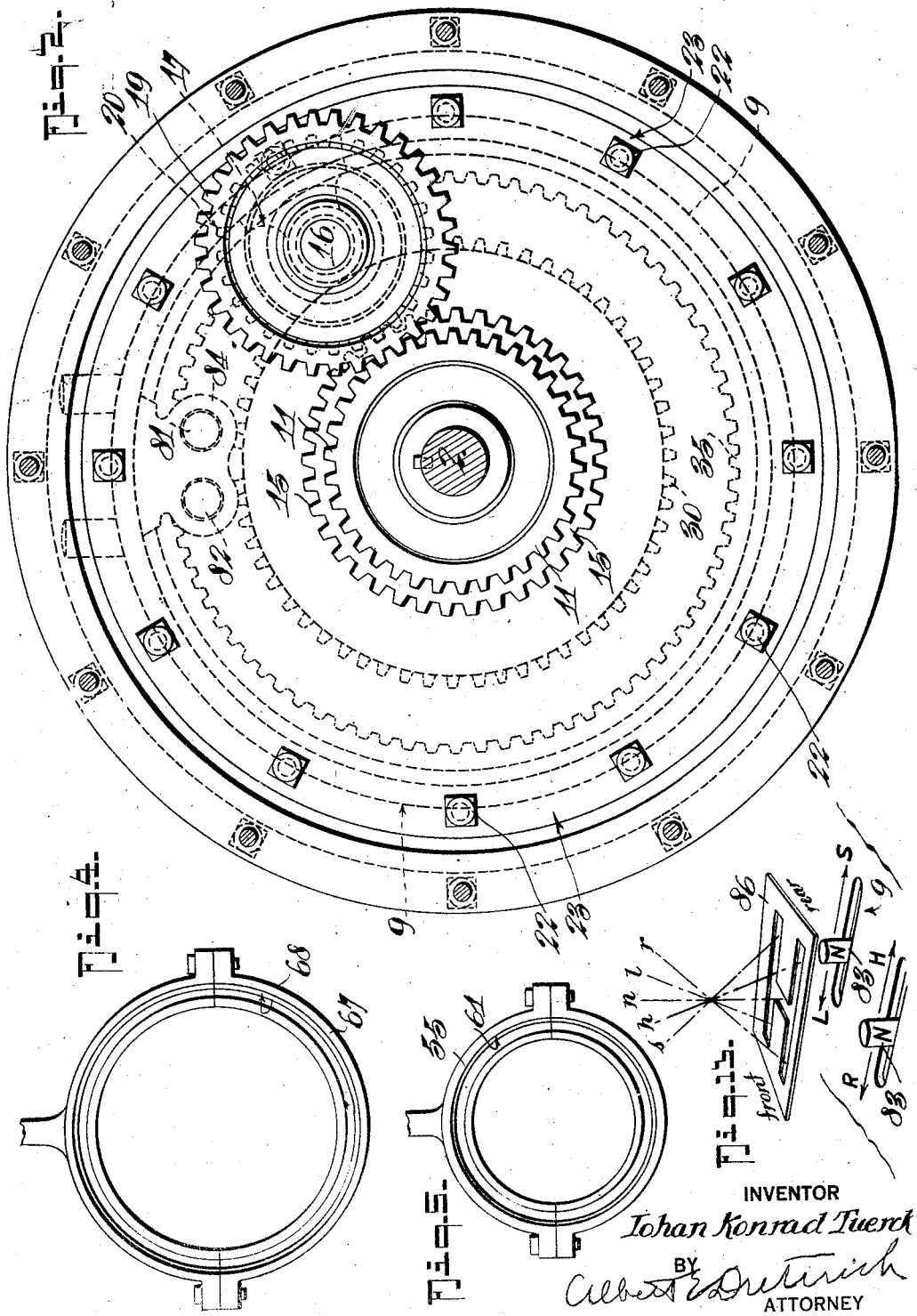

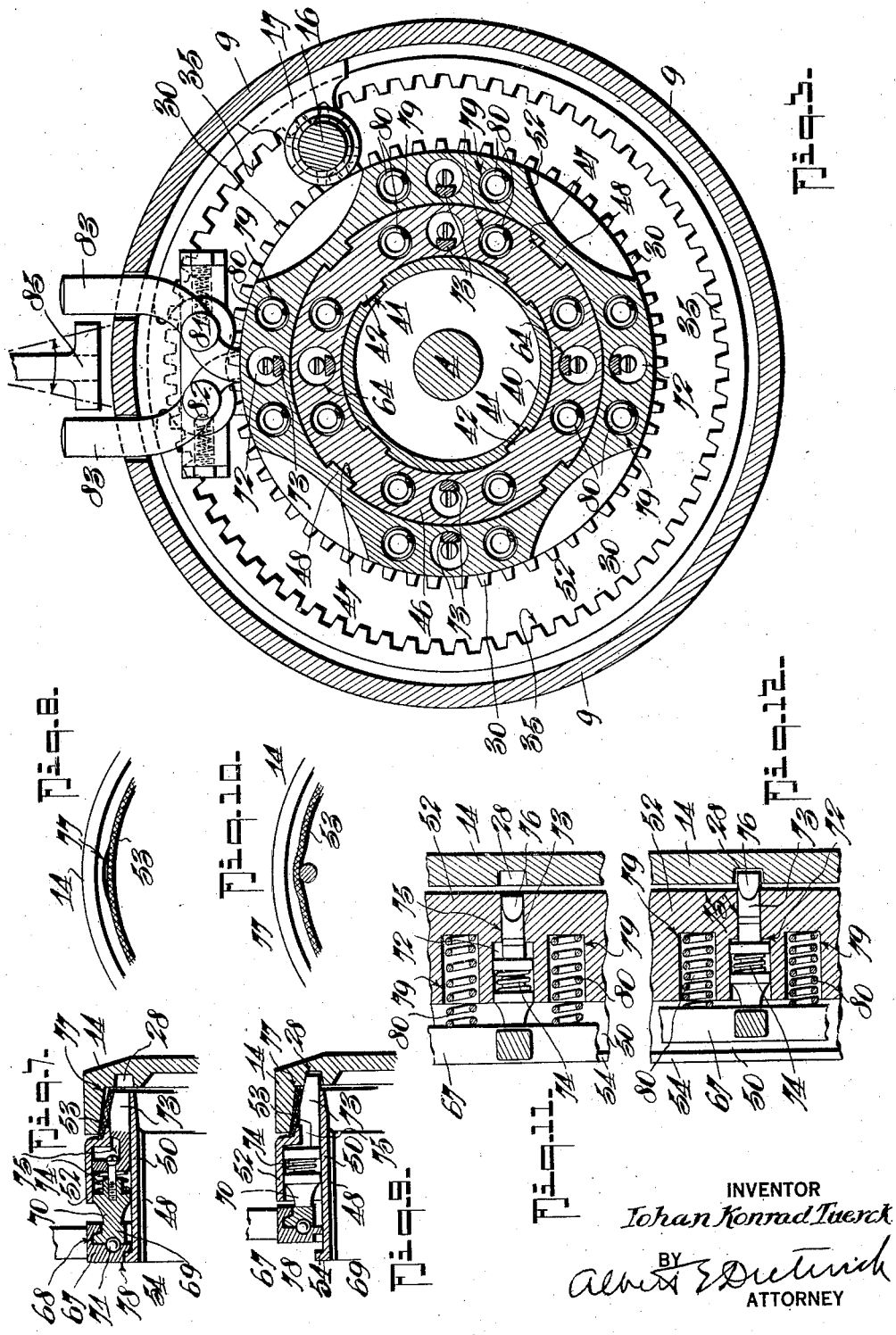

Patented Dec. 21, 1926.

1,611,618

UNITED STATES PATENT OFFICE.

IOHAN KONRAD TUERCK, OF PORTLAND, OREGON.

POWER-TRANSMISSION GEARING.

Application filed June 21, 1926. Serial No. 117,475.

My invention relates to certain new and useful improvements in power transmission gearing, especially such as are designed and adapted for use in motor vehicles and the like, and it has among its objects the provision of a strong, durable, inexpensive and fool proof mechanism of such structure that the employment of the usual clutch between the engine shaft and the driving shaft of the transmission mechanism may, if desired, be dispensed with, thereby reducing the foot-labor of the operator since he can effect the shifting of the gears solely by manipulating a gear shifting lever or levers, and he may do this without danger of breaking the gears; another object of the invention is to provide a transmission mechanism of such design and cooperative association of parts that the operator may make use of the "reverse" gearing as a brake through the propelling shaft to both rear wheels, thereby rendering possible the keeping under control of one gear shifting lever, the gear combination and also a brake action (this enables the usual service brakes on the rear wheels to be dispensed with or omitted if desired).

A further object of the invention is to provide a power transmission mechanism, for use on motor vehicles, which is so constructed that the gears may be changed quickly and independently of any and all other connections, from the engine to the driving shaft, that may be present (the usual throw-out clutch connection for example).

My present invention also has for an object the provision of a power transmission mechanism in which the several speed changes can be made without clashing of gears (eliminating noise) and yet the advantages of positive mechanical interlocking or engagement between the several elements may be retained, the engagement and disengagement action between the several connecting elements being made in a manner that will not interfere with the normal running of the engine (danger of choking the engine is avoided) and the engagement will be made without noise, kicking, clashing or jerking motions.

In devising my present invention I also have in mind the production of a transmission mechanism, by the employment of which in motor vehicles, the strain on the operator of driving the car can be reduced considerably.

In its general nature the invention comprises a housing in which the driving, driven and countershafts are journalled in suitable bearings, the driving shaft having a driving gear meshing with one of a pair of gears rotating on a countershaft and associated with speed change gearing and clutch elements provided with the driving shaft and adapted to cooperate to effect the forward speeds, one of said shifting elements having provision to cooperate with a "reverse" gear and clutch mechanism to effect the reverse action, the several forward clutch elements being in the nature of cone clutches and being associated with positive locking fingers so arranged that after the cone clutches have been brought into engagement the locking fingers will effect a direct mechanical connection between the parts and at the same time apply an expanding action to the clutch faces to insure tight engagement.

In its more detailed nature the invention also embodies those novel features of construction, combination and arrangement of parts, all of which will be first fully described, then be specifically pointed out in the appended claims, reference being had to the accompanying drawings, in which:—

Figure 1 is a central vertical longitudinal section of the invention.

Figure 2 is an end elevation of the invention with the end cover removed.

Figure 3 is a vertical cross section taken on the line 3—3 on Figure 1.

Figures 4 and 5 are face views of one of the large shifting rings and the small shifting ring respectively.

Figure 6 is a detailed cross section of the low and reverse speed transmission pinions.

Figure 7 is a detail vertical longitudinal section showing one of the second or intermediate speed clutching elements moved to the engaging but not locked position.

Figure 8 is a diagrammatic fragmentary cross section showing the position of the clutch disk and band when the parts are positioned as shown in Figure 7.

Figure 9 is a view similar to Figure 7 illustrating the fully engaged and locked position.

Figure 10 is a view similar to Figure 8 with the parts shown as in Figure 9.

Figures 11 and 12 are fragmentary horizontal sections taken through the units shown and as positioned in Figures 7 and 9.

Figure 13 is a diagrammatic perspective view illustrating how the common type of H-plate shifting method may be employed to operate the invention.

In the drawings in which like numerals of reference indicate like parts in all the figures, and in which is illustrated the preferred embodiment of my invention, 1 designates the engine which is coupled with the driving shaft 2 of the power transmission mechanism in any suitable manner as by a male and female coupling indicated at 3 in Figure 1 of the drawings.

The driven shaft is designated 4 and its rear end is adapted to connect with the universal joint (not shown) when used in a motor vehicle. The shaft 4 has its forward end reduced, as at 5, to lie within the bearing recess 6 in the shaft 2, a suitable removable bearing 7 being secured in the hub 8 of the main housing 9.

The bearing 7 has an abutment flange 10, the purpose of which will later appear.

A driving gear or pinion 11 is suitably secured on the shaft 2 always to rotate therewith.

A sleeve 12 has bearing on the shaft 2 and is hereinafter termed the "second-speed" sleeve.

A gear 15 is keyed on the sleeve 12 and 16 designates a countershaft journaled in suitable bearings 17 and 18. The countershaft 16 carries at its front end two gears of varying sizes that rotate together as a unit, these gears being indicated by the reference numerals 19 and 20, the gear 19 meshing with the gear 11 and the gear 20 with the gear 15.

An auxiliary housing 21 is provided at the front end of the main housing and has secured thereto at 22 the partition-wall 23 and the end cover plate 24. A removable tapered bearing 25 is provided and is located in the partition wall 23, in which bearing the sleeve 12 is journalled, and 26 designates a suitable means for securing the bearing 25 in place.

Suitable anti-friction bearings 27 are interposed between the thrust faces of the female clutch elements 13, 14, and between the female clutch element 14 and the bearing 25 as shown. These anti-friction bearings may be of any approved kind, roller bearings being shown for convenience of illustration. The female clutch elements 13 and 14 are each provided with finger receiving pockets or recesses 28, of which more will be said later.

On the rear end of the countershaft 16 is located a pinion 29 which meshes with the driven gear 30. The gear 30 is provided with a female clutch face 31 and is carried by the "low speed" sleeve 32 which is freely rotatable on the "reverse" sleeve 33 which is in turn rotatable on the sleeve bearing 7 with one end thereof abutting the flange 10 of that bearing and the other the hub 8 of the housing.

The "reverse" sleeve 33 carries the female clutch face 34 and has secured thereon the rim gear 35 to which rotation is imparted by the tapered pinion 36 also mounted on the rear end of the countershaft 16.

Suitable anti-friction bearings 37 may be interposed between the hub 8 and the hub of the gear 35 to take up thrust on that end of the "reverse" sleeve 33 and suitable anti-friction bearings 38 may be interposed between the sleeves 32 and 33, and the sleeve 32 provided with an end thrust collar 39 if desired.

It will be observed, by reference to Figure 1, that the clutch elements 13 and 14 bear nested relation at the front end of the housing and those 31 and 34 bear a like relation at the rear end of the housing. By this arrangement a very compact, simple well balanced structure is provided wherein is utilized a minimum of gearing and shafting in the practical accomplishment of the purpose for which the invention is designed.

In order to couple the driving shaft 2 and the driven shaft 4, through selected ones of the female clutch elements to impart rotation to the latter shaft at the desired speed and in the desired direction, I provide a plurality of easily shiftable male clutching elements.

For this purpose the driven shaft 4 is provided with a drum-like enlargement 40 grooved as at 41 to receive the tongues 42 of the sleeves 43 and 44 thus mounted slidably upon the enlargement but rotative therewith. Each sleeve 43 and 44 carries an annular body enlargement 45 and 46 respectively which enlargements are in turn grooved at 47 to receive the tongues 48 of other sleeves 49 and 50 to thus slidably mount the said last named sleeves upon the said bodies to rotate therewith. The sleeves 49 and 50 are also provided with body enlargements 51 and 52.

Each of the bodies 45, 46, 51 and 52 is provided with an extended male clutch nose element equipped with a clutch band 53 of suitable friction providing material adapted to frictionally engage the clutch faces of the several female clutch elements. The said bodies thereby provide shiftable male clutch elements.

Each of the sleeves 43, 44, 49 and 50 is provided with an abutment flange 54 the purpose for which will presently appear.

A shifter ring 55, which serves as a shifting means for the high and reverse male elements, is provided and encircles the inner ends of the sleeves 43 and 44 in the space between the inner ends of the sleeves 49 and 50 and the said ring is provided with a pair of lateral abutment flanges 56 each thereof being adapted to lie just outside of a respective one of the flanges 54 of the first mentioned sleeves.

A pair of pusher rings 57 are mounted upon the sleeve 43 in position for being engaged by the adjacent end of the ring 55 and the said rings have ball bearings 58 between their opposed surfaces so that one thereof may rotate freely while the other one, which lies against the ring 55, remains stationary. The rings engage the inner ends of a plurality of buffer springs 59 positioned in the annular recess 60 with which the head or body 45 is provided and thus a yieldable means for forcing the reverse effecting male element to operative position is provided. As the springs 59 always hold the abutment flange 54 of the sleeve 43 in engagement with the respective abutment flange of the shifter ring 55 when that ring is forced to the left of Figure 1 of the drawings the reverse effecting male element will be forced into its operative engagement with the reverse clutch element, and when the reverse movement of the said ring is effected, the said abutment flanges will provide for a retraction of the said male element to its normal neutral position.

At its other side the ring 55 is grooved as at 61 to receive an annular ring 62 which carries a plurality of projected heads 63 which are adapted to move longitudinally in pockets 64 formed in the head or body 46 of the sleeve 44 before mentioned. As it is necessary for the ring 62 to rotate with the sleeve and body just referred to ball bearings 65 are interposed between the said ring 62 and the shifting ring end to prevent undue friction.

Each of the sleeves 49 and 50 is also provided with a shifting ring 66 and 67 respectively, each of which is in turn recessed as at 68 to receive an annular ring 69 having projected heads 70. Ball bearings 71 are interposed between the rings 69 and the respective rings 66 and 67 to prevent undue friction and the projected heads 70 of the rings are operable in bores 72 provided in the bodies 45 and 46. Each of the heads 70 and 63 carries a clutch-lock finger 73 yieldably connected thereto as at 74 and operable through an off-center bore 75 provided in the respective bodies 46—51—52. The lock fingers 73 have their outwardly directed surfaces flattened as at 76 to provide a cam-like portion for engaging the inner surfaces of the clutch bands 53.

All of the female clutch elements 13—14 and 31 may be provided with small sockets or grooves 77, as indicated in Figures 1, 8 and 10 of the drawings, the purpose for which will later appear.

The rings 66 and 67 are grooved as at 78 to receive the abutment flanges 54 of the sleeves 49 and 50, see Figures 1, 7 and 9.

It will be observed by reference to Figures 3, 11 and 12, that each of the bodies 46, 51 and 52 is equipped with a plurality of spring pockets 79 preferably arranged in pairs one at each side of each of the bores 72, as indicated in the said figures. The pockets 79 are each equipped with a buffer spring 80, one end of which seats against the end of the respective pocket and the other against the respective ring cooperating with the particular head. The springs serve to normally hold the shifter rings to their normal position against the sleeve abutment flanges 54 and with the clutch lock fingers 73 retracted.

A shifter rod 81 is provided and adapted for operating the low and second speed effecting elements and a similar rod 82 is provided for cooperating with the high and reverse speed effecting elements each of the said rods being equipped with an upward extension 83 and being longitudinally slidable in bearings 84 suitably secured to the housing 9.

While any desired means for shifting the rods 81 and 82 longitudinally for actuating the clutching elements may be employed I have diagrammatically indicated in Figures 1 and 3, and especially in Figure 13, how the said rods may be shifted in a manner utilizing the usual H-plate shifting equipment. When such equipment is employed for shifting the rods, 85 may represent the lower notched end of the shifting lever which may be mounted as diagrammatically indicated in Figure 13 in cooperative relation with the usual type of H-plate 86 through which the same is shiftable from a vertical central or neutral position, such as is indicated in Figures 1 and 3 of the drawings laterally into engagement with a selected one of the upward projections 83 and forwardly or rearwardly for operating the clutch elements controlled by such selected projection.

In Figure 13 of the drawings, line $n$ indicates the vertical or neutral position of the shifting lever when the parts would be in the position illustrated in Figure 1 of the drawings. Line $l$ indicates the lever shifted toward the left in the manner for causing its lower end to move toward the right and engage the right hand projection 83 and by moving the lever to the position shown rearwardly in the right hand slot of the H-plate the said projection would be forced forwardly and the clutch element for effecting a low speed power transmission would be actuated. Then, by moving the lever forwardly the lower end thereof would be caused to move rearwardly through the said right hand slot of the H-plate causing the projection 83 to move rearwardly and bring into action the second speed effecting power transmission elements, see line s on Figure 13. When the lever is moved rearwardly in the opposite slot of the H-plate to the position indicated by line r the left hand rod projection 83 would be moved forwardly to effect a functioning of the reverse power transmission effecting agencies and when the lever is moved to the position indicated by line h the said last named projection 83 would be moved rearwardly to effect a functioning of the high speed effecting power transmission agencies, the capital letters N indicate the neutral positions of the projections 83, while those L, S, R and H indicate the direction of movement for effecting the low, second, reverse and high speed effecting element functions respectively. When the low speed power transmission is desired the same is obtained through engine shaft 1, drive shaft 2, gears 11 and 19, countershaft 16, pinion 29, gear 30, through the clutch elements 31, sleeve 49, sleeve 43, and drum 40 to the driven shaft 4.

When it is desired to reverse the direction of rotation of the driven shaft 4 that reverse rotation is imparted through driven shaft 1, gears 11 and 19, countershaft 16, tapered pinion 36, rim gear 35, sleeve 33, and the clutch elements 34, 43 and 40 to the driven shaft 4.

When it is desired to effect second speed power transmission the same is imparted through engine shaft 1, gears 11 and 19, 20 and 15, sleeve 12, clutch elements 14, 50, 44 and drum 40 to the driven shaft 4.

When it is desired to impart high speed power transmission to the driven shaft 4 the same is imparted through engine shaft 1, driven shaft 2 and directly through clutch elements 13, 44 and drum 40 to the driven shaft 4. It is to be understood that in bringing the male clutch elements which are equipped with the clutch lock pins 73 into action, the first part of the movement of the respective shifting ring toward the cooperative female clutch elements causes the whole of any such element to move as a unit until its band 53 engages the female clutch element surface when movement of the sleeve and body of the respective element will be arrested. Further movement of the particular shifting ring causes the fingers 73 of the unit to be pressed against the opposing wall of the female clutch member until the receiving pockets 28 thereof align with the fingers whereupon the fingers will enter the said pockets and lock the parts to the clutch position see Figures 7, 9, 11 and 12.

The provision of the yieldable connection 74 of the fingers with their carrying ring allows sufficient yield to prevent the fingers becoming broken or damaged during the clutching action and permits them to automatically find their way into the recesses 28. Not only does this projection of the pins 73 positively lock the clutching elements together but the flattened faces 76 thereof will be forced into engagement with the clutching bands 53 and expand the same tightly into the seat in the female clutch element and into the grooves 77, thus positively assuring proper coaction of the clutching elements.

By providing the yieldable connections 57, 59 for shifting the reverse male clutching elements 45 into engagement with its coperative female clutch element the same may be utilized as a brake in addition to its reverse motion power transmission function, by gradually forcing the same into clutched relation permitting slipping thereof until full braking action has been accomplished.

By arranging the clutch elements as illustrated in Figure 1 of the drawings it is necessary to provide only two shifting rods, each of which has a central neutral position and becomes effective for one of its two functions, high speed effecting or reverse rotation effecting, low speed effecting or second speed effecting, when shifted longitudinally in either direction.

In this manner a particularly compact mechanism is made possible and practical functioning effected with a minimum of effort and movement. By this arrangement, it is also possible to use a smaller number of transmission gears than are commonly used in devices of similar accomplishment and the gears that are provided remain continually in mesh eliminating the necessity of shifting the gears with the danger of damaging the same in effecting the shifting thereof and the noise usually accompanying such action.

From the foregoing description, taken in connection with the accompanying drawings, it will be seen that if my present invention be used on motor vehicles, the operator, should he find his machine beginning to skid or slip, may throw the mechanism to the "reverse" position gradually, (letting the reverse clutch slip) bringing the reverse clutch elements into engagement; this will reduce the rear wheel speed to zero and then start them to turning in the reverse direction, the operator, of course, giving the engine sufficient gas at the same time to prevent stalling. In this manner, and especially if the car is equipped with service brakes on the front wheels only, the car may be brought to a quick dead stop and all danger of skidding or slipping eliminated.

It will also be seen by my arrangement the high and reverse speed changes are effected by the same shifting movement, i. e., when the high speed shift is effected the reverse is out, and when a quick shift is desired from high speed position to reverse the very act of moving the parts out of high if continued far enough moves the parts in the reverse position. In other words, if a quick stop is to be made and the operator utilizes the reverse as a brake, the very act of releasing "high" is continued to draw in the reverse clutch, thus making it unnecessary to shift through either first and second speeds to get to reverse from high.

Attention is further called to the fact that by the employment of cone clutches and clutch band expanding and locking pin devices for each forward speed mechanism, it is possible for the male and female clutch elements to engage smoothly and their speeds of rotation brought practically into unison before the locking fingers or pins come into action. Conversely, by my arrangement the locking fingers are withdrawn before the clutch faces are disconnected and further withdrawal movement of the locking fingers results in disengaging the clutch faces. This makes the action both smooth and noiseless.

From the foregoing description, taken in connection with the accompanying drawings, it is thought the novel details of construction, manner of operation and the advantages of my invention will be readily apparent to those skilled in the art.

What I claim is:

1. In power transmission gearing, a driving shaft, a driven shaft, bearings sustaining said shafts, a reverse gear having a bearing sleeve mounted on the driven shaft bearing and including a female clutch, a low speed gear mounted on said reverse gear sleeve and having a female clutch, a driving gear on the driving shaft, a high speed female clutch on the driving shaft, a second speed female clutch with a bearing sleeve on said driving shaft, a gear on said second speed clutch sleeve, a countershaft having gears meshed with the driving gear, the second speed gear, the low speed gear and the reverse gear, and a series of male clutches mounted on the driven shaft, and means selectively to shift said male clutches into engagement with one or another of said female clutches.

2. In power transmission gearing, a driving shaft, a driven shaft, bearings sustaining said shafts, a reverse gear having a bearing sleeve mounted on the driven shaft bearing and including a female clutch, a low speed gear mounted on said reverse gear sleeve and having a female clutch, a driving gear on the driving shaft, a high speed female clutch on the driving shaft, a second speed female clutch with a bearing sleeve on said driving shaft, a gear on said second speed clutch sleeve, a countershaft having gears meshed with the driving gear, the second speed gear, the low speed gear and the reverse gear, a drum on said driven shaft, a high speed and a reverse speed male clutch mounted on said drum, a low speed male clutch mounted on said reverse speed clutch, an intermediate speed male clutch mounted on said high speed male clutch, means for shifting said high and reverse speed male clutches in unison to engage their respective female clutches alternately, and means for shifting said low speed and said intermediate speed clutches in unison to engage their respective female clutches alternately, said shifting means including a selecting and shifting lever.

3. In power transmission mechanism, a driving shaft, a driven shaft, bearings sustaining said shafts, a reverse gear and a low speed gear concentrically mounted with respect to and over said driven shaft, each of said gears having a clutch nested one over the other, a driving shaft having a high speed clutch, an intermediate speed clutch mounted on said drive shaft and nested with respect to said high speed clutch, a driving gear on said driving shaft, an intermediate speed gear carried by said intermediate speed clutch, a countershaft with gears meshing with the several aforementioned gears respectively, and nested shiftable clutches concentrically carried on said driven shaft, and means selectively to shift said shiftable clutches into and out of engagement with said gear clutches.

4. In power transmission mechanism, a driving shaft, a driven shaft, bearings sustaining said shafts, a reverse gear and a low speed gear concentrically mounted with respect to and over said driven shaft, each of said gears having a clutch nested one over the other, a driving shaft having a high speed clutch, an intermediate speed clutch mounted on said drive shaft and nested with respect to said high speed clutch, a driving gear on said driving shaft, an intermediate speed gear carried by said intermediate speed clutch, a countershaft with gears meshing with the several aforementioned gears respectively, a drum carried by said driven shaft, high and reverse speed clutches mounted on opposite ends of said drum and shiftable along the axis of said driven shaft to engage with the high speed clutch of the driving shaft and with the clutch of the reverse gear alternately, a shifting member connecting said shiftable clutches to move in unison, an intermediate speed shiftable clutch mounted concentrically on said high speed shiftable clutch, a low speed shiftable clutch mounted on said reverse speed shiftable clutch, a shifting element connecting said intermediate and low speed shiftable clutches to operate in unison alternately to engage respectively the first mentioned intermediate speed clutch and the first mentioned low speed clutch, and an operating lever for selectively engaging said clutch shifting members.

5. In power transmission mechanism, a driving shaft, a driven shaft, bearings sustaining said shafts, a reverse gear and a low speed gear concentrically mounted with respect to and over said driven shaft, each of said gears having a clutch nested one over the other, a driving shaft having a high speed clutch, an intermediate speed clutch mounted on said drive shaft and nested with respect to said high speed clutch, a driving gear on said driving shaft, an intermediate speed gear carried by said intermediate speed clutch, a countershaft with gears meshing with the several aforementioned gears respectively, a drum carried by said driven shaft, high and reverse speed clutches mounted on opposite ends of said drum and shiftable along the axis of said driven shaft to engage with the high speed clutch of the driving shaft and with the clutch of the reverse gear alternately, a shifting member connecting said shiftable clutches to move in unison, an intermediate speed shiftable clutch mounted concentrically on said high speed shiftable clutch, a low speed shiftable clutch mounted on said reverse speed shiftable clutch, a shifting element connecting said intermediate and low speed shiftable clutches to operate in unison alternately to engage respectively the first mentioned intermediate speed clutch and the first mentioned low speed clutch, an operating lever for selectively engaging said clutch shifting members, said shiftable clutches each comprising friction elements and positive engaging elements and means for effecting engagement of the friction elements in advance of the engagement of the positive engaging elements.

IOHAN KONRAD TUERCK